United States Patent Office

3,291,626
Patented Dec. 13, 1966

3,291,626
STABILIZED PIGMENT SLURRIES
Billy E. Shurling and Nathan Millman, Macon, Ga., assignors to J. M. Huber Corporation, Locust, N.J., a corporation of New Jersey
No Drawing. Filed Dec. 26, 1962, Ser. No. 247,334
7 Claims. (Cl. 106—193)

This invention relates to the method of stabilizing aqueous slurries of inorganic pigments by means of additives.

Generally when aqueous slurries of inorganic pigments are shipped in tank cars, they arrive at their destination in a condition which makes it very difficult to pump all the pigment out of the car. This condition is the result of the pigment settling in strata with a substantial portion, usually about 1 to 2 feet, at the bottom of the tank car as a thick unpenetrable gel topped by a skim or bridge which is a very thick, hard layer of pigment, above the bridge is a relatively flowable slurry topped by a layer of water. The great difficulty of completely emptying the tank cars and the loss of pigment resulting from the unstable slurry is a problem, the solution of which has been sought in vain by those skilled in the art. The aqueous slurries of inorganic pigments exhibit the same characteristics when they are stored for extended periods of time.

It is an object of this invention to provide a method of stabilizing pigment slurries.

It is a further object of this invention to provide pigment slurries which remain in uniform suspension for extended periods of time.

Other objects and advantages of this invention will be apparent from the following specification.

We have discovered that by causing the pH of an aqueous slurry of finely divided inorganic pigments to come within a certain critical range, the slurry remains uniform throughout and maintains its homogeneity indefinitely.

The additives generally utilized to accomplish this result are either aluminum sulfate or sulfuric acid. While other acidic substances such as aluminum chloride or aluminum nitrate can be used to accomplish the same lowering of pH and resultant stability of the aqueous pigment slurry as the alum or sulfonic acid, these other acidic substances introduce anions which are foreign to and/or not compatible with paper furnishes or require that the slurry be uneconomically low in solids content. Since the pigment slurry is used predominately in papermaking, the use of alum or sulfuric acid as additives enhance its utility.

The alum or sulfuric acid can be used alone or in combination with small amounts of carboxymethyl cellulose (CMC), starches, protein, gums and polyphosphates such as tetrasodium pyrophosphate (TSPP).

The pigment slurry must contain sufficient alum or sulfuric acid to bring the slurry pH to between 5.8 and 8.1. Generally, after standing about a week the pH of the slurry changes slightly, to about 6.0 to 8.6. If the initial pH of the slurry is lowered below about 5.8 the viscosity of the slurry becomes too high and the slurry cannot be unloaded from the car. If the initial pH of the slurry is higher than about 8.1 the additive has no substantial effect in preventing the slurry from fractionating.

Pigment slurries advantageously treated according to this invention are those containing in aqueous medium about at least 20% of finely divided particulate inorganic pigments such as, for example, inorganic compounds of silica including hydrated silica, precipitated aluminum silicates, sodium-alumino silicates, calcium silicates and calcium-sodium-alumino silicates; various metal oxides and hydrates such as alumina and the like, however, generally the highest preferred solids content of the slurry is up to about 50%.

These pigments are available on a commercial basis and include the following, all of which are finely divided particulate substances.

Zeolex®, very finely divided precipitated sodium alumino silicate pigments of submicron particle size and disclosed in U.S. Patents 2,739,073 and 2,848,346.

Hi-Sil®, a precipitated hydrated silica of very fine particle size.

Alumina C®, a hydrated aluminum oxide of small particle size.

The following examples illustrate the process of this invention.

EXAMPLE 1

The solids content of an aqueous slurry of sodium alumino silicate pigment (Zeolex® 23) was reduced from 28.4% to 26% with water and mixed for 10 minutes. The pH of the slurry was 9.35 and the viscosity was 41 centipoises. 1000 ml. of the slurry was poured in a liter cylinder and allowed to stand undisturbed for a week. After the week of standing the slurry was tested for water on top, percent pour out by volume and dry weight, presence of a bridge, characteristics upon probing, viscosity and pH.

EXAMPLE 2

The solids content of an aqueous slurry of sodium alumino silicate pigment (Zeolex® 23) was reduced from 28.4% to 26% with water. Sufficient $Al_2(SO_4)_3 \cdot 18H_2O$ was added to reduce the pH of the slurry to 8.0. The slurry was mixed for 10 minutes. The pH of the slurry was 8.0 and the viscosity was 224 centipoises. 1000 ml. of the slurry was poured in a liter cylinder and allowed to stand undisturbed for one week after which it was tested as in Example 1.

EXAMPLE 3

The procedure of Example 2 was repeated except sufficient alum was added to the slurry to bring the pH down to 7.0. The slurry was tested as in Example 1, after standing 1 week.

EXAMPLE 4

The procedure of Example 2 was repeated except sufficient alum was added to the slurry to bring the pH down to 6.0. The slurry was tested as in Example 1, after standing one week.

EXAMPLE 5

The solids content of an aqueous slurry of sodium aluminosilicate pigment was reduced from 28.4% to 26% with water. Sufficient concentrated sulfuric acid (1 ml.=1.84 g.) was added to reduce the pH of the slurry to 8.0. The slurry characteristics were then tested as in Example 1.

EXAMPLE 6

The procedure of Example 5 is repeated except sufficient sulfuric acid is added to bring the pH of the slurry down to pH 7. The slurry characteristics were then tested, after one week, as in Example 1.

EXAMPLE 7

The procedure of Example 5 is repeated except sufficient sulfuric acid is added to bring the pH of the slurry down to pH 6. The slurry characteristics were then tested, after one week as in Example 1.

EXAMPLE 8

The solids content of an aqueous slurry or sodium aluminosilicate pigment (Zeolex® 23) was reduced from 28.4% to 26% with water. Sufficient concentrated sulfuric acid was added to bring the pH of the slurry down to 6.8. 0.05% carboxymethyl cellulose (CMC) based on the dry weight of the pigment was then added to the slurry which was then mixed for 60 minutes, the viscosity of the slurry was 180 centipoises. 0.025% CMC, based on the dry weight of the pigment was then added to the slurry. The treated slurry was then mixed for 30 minutes. Its pH was 6.9 and its viscosity was 350 centipoises. 1000 ml. of the slurry was added to a liter cylinder and allowed to stand for one week. The slurry characteristics were then tested as in Example 1.

EXAMPLE 9

The solids content of an aqueous slurry of sodium alumino-silicate pigments (Zeolex® 23) was raised from 28.5% to 30% by the addition of dry Zeolex 23 to the slurry and mixed 10 minutes. The pH of the slurry was 9.35 and its viscosity was 1820 centipoises. 1000 ml. of the slurry was transferred into a liter cylinder and allowed to stand one week. The characteristics of the slurry were then tested as in Example 1.

EXAMPLE 10

The solids content of an aqueous slurry of sodium aluminosilicate pigment (Zeolex® 23) was raised from 28.5% to 30% by adding dry Zolex 23. Sufficient concentrated sulfuric acid to lower the pH of the slurry to 7.85 was added and the slurry was mixed for 10 minutes. 1000 ml. of the slurry was transferred into a liter cylinder and allowed to stand one week. The characteristics of the slurry were then tested as in Example 1.

EXAMPLE 11

The procedure of Example 10 was repeated except sufficient sulfuric acid was added to lower the pH of the slurry to 7.0. The slurry characteristics were determined as in Example 1, after standing one week.

EXAMPLE 12

The procedure of Example 11 was repeated except sufficient sulfuric acid was added to the slurry to bring the pH down to 5.9. The slurry characteristics were determined as in Example 1, after standing one week.

EXAMPLE 13

The solids content of an aqueous slurry of sodium aluminosilicate (Zeolex® 23) pigment was raised from 28.5% to 30% by the addition of dry Zeolex® 23. Sufficient alum was added to reduce the pH of the slurry to 7.85 and it was mixed for 10 minutes. 1000 ml. of slurry was put in a liter cylinder and allowed to stand one week. The slurry characteristics were then determined as in Example 1.

EXAMPLE 14

The solids content of an aqueous slurry of sodium aluminosilicate pigment (Zeolex® 23) was reduced from 28.5% to 28% with water. Sufficient alum was added to lower the pH to 7.85 and the slurry was then mixed for 10 minutes. 1000 ml. of slurry was put in a 1 liter cylinder and allowed to stand for one week. The slurry characteristics were then determined as in Example 1.

EXAMPLE 15

The procedure of Example 14 was followed except the solids content of the slurry was reduced to 24% and the pH was lowered to 7.90 with alum. The slurry characteristics were determined after one week, as in Example 1.

EXAMPLE 16

The procedure of Example 14 was followed except the solids content of the slurry was reduced to 22% and the pH was lowered to 7.90 with alum. The slurry characteristics were determined, after one week, as in Example 1.

EXAMPLE 17

The procedure of Example 14 was followed except the solids content of the slurry was reduced to 20% and the pH was lowered to 7.90 with alum. The slurry characteristics were determined as in Example 1.

EXAMPLE 18

The solids content of an aqueous slurry of sodium aluminosilicate pigment was reduced to 25% with water. Sufficient alum was added to lower the pH of the slurry to 7.5. 1000 ml. of the slurry was put in a 1 liter cylinder and allowed to stand for one week. The slurry characteristics were determined as in Example 1.

EXAMPLE 19

The procedure of Example 18 was followed except the pH of the slurry was lowered to 7.8 with alum. The slurry characteristics were determined as in Example 1.

EXAMPLE 20

The procedure of Example 18 was followed except the pH of the slurry was lowered to 8.5 with alum. The slurry characteristics were determined as in Example 1.

EXAMPLE 21

The procedure of Example 18 was followed except the pH was lowered to 8.0 with alum. The slurry characteristics were determined as in Example 1.

The results from each of the Examples 1 through 21 are shown in Table I.

Table I

| Example | Treatment | Percent Solids | Viscosity, Fresh | pH Fresh | Stability After Standing One Week ||||||| 
|---|---|---|---|---|---|---|---|---|---|---|---|
| | | | | | Water on Top, in. | Percent Pour Out ||| Probe | Viscosity | pH |
| | | | | | | Volume | Dry Weight | Bridge | | | |
| 1 | Control | 26 | 41 | 9.35 | 3.5 | 38 | 19.2 | Yes | Heavy in bottom | | |
| 2 | Alum | 26 | 224 | 8.0 | .5 | 100 | 100 | No | Uniform | 18 | 8.1 |
| 3 | do | 26 | 1,290 | 7.0 | .375 | 100 | 100 | No | do | 42 | 7.0 |
| 4 | do | 26 | 1,760 | 6.0 | .375 | 100 | 100 | No | do | 324 | 6.1 |
| 5 | H₂SO₄ | 26 | 28 | 8.0 | .75 | 90.0 | 87.8 | No | Slight sediment | 24 | 8.5 |
| 6 | H₂SO₄ | 26 | 22 | 7.0 | .625 | 93.0 | 90.0 | No | do | 22 | 7.15 |
| 7 | H₂SO₄ | 26 | 22 | 6.0 | .5 | 98.4 | 97.8 | No | do | 22 | 6.1 |
| 8 | H₂SO₄+.075% CMC | 26 | 350 | 6.9 | .125 | 100 | 100 | No | Uniform | 240 | 7.4 |
| 9 | Control | 30 | 1,820 | 9.35 | .125 | 0 | 0 | No | Thick | | |
| 10 | H₂SO₄ | 30 | 300 | 7.85 | .125 | 90.5 | 88 | No | Uniform | 72 | 8.05 |
| 11 | H₂SO₄ | 30 | 200 | 7.0 | .25 | (¹) | | No | do | 50 | 7.1 |
| 12 | H₂SO₄ | 30 | 350 | 5.9 | .25 | 100 | 100 | No | do | 44 | 6.15 |
| 13 | Alum | 30 | 960 | 7.85 | .125 | 100 | 100 | No | do | 60 | 8.1 |
| 14 | do | 28 | 320 | 7.85 | .25 | 100 | 100 | No | do | 28 | 8.1 |
| 15 | do | 24 | 56 | 7.90 | .375 | 100 | 100 | No | do | 20 | 8.1 |
| 16 | do | 22 | 45 | 7.90 | .75 | 100 | 100 | No | do | 16 | 8.1 |
| 17 | do | 20 | 28 | 7.90 | 1.75 | 100 | 100 | No | do | 14 | 8.1 |
| 18 | do | 25 | 314 | 7.5 | .5 | 100 | 100 | No | do | 52 | |
| 19 | do | 25 | 140 | 7.8 | 1 | 100 | | No | do | | |
| 20 | do | 25 | 18 | 8.5 | 1.5 | 69 | | No | 3″ sediment in bottom | | |
| 21 | do | 25 | 45 | 8.0 | 1 | 100 | 100 | No | Uniform | | |

¹ Trace in bottom.

The data in Table I indicates that when the pigment slurry contains from about 20% to 30% solids concentration and is at a fresh pH of about 5.8 to 8.1, the slurry remains substantially homogeneous and completely pours out of its container. Sulfuric acid has less effect on the viscosity of the slurry than the alum, however, the alum treatment is more effective on the pour out and more completely stabilizes the slurry over a greater range of pH's.

This process is effective in stabilizing aqueous slurries of hydrated silica pigments such as for example, Hi-Sil® 404. Example 22 is a typical treatment. The results of this and other treatments carried out in the same manner are shown in Table II.

*Table II*

| Treatment | Percent Solids | pH, Fresh | Stability After Standing One Week |
|---|---|---|---|
| Control | 25 | 8.05 | No pour. |
| Alum | 25 | 7.1 | Too thick, no flow. |
| Do | 25 | 6.4 | Solidification. |
| H₂SO₄ | 25 | 7.0 | Too thick, no flow. |
| Control | 23 | 8.1 | 76% flowed. |
| Alum | 23 | 7.1 | Slighly thick, 90% flowed. |
| Control | 20 | 8.1 | 92% flow. |
| Alum | 20 | 7.0 | 100% flow. |

EXAMPLE 22

An aqueous slurry of hydrated silica (Hi-Sil® 404) containing 20% pigment was dispersed with 0.9% sodium hexametaphosphate. Sufficient alum $(Al_2(SO_4)_3 \cdot 18H_2O)$ was added to reduce the pH of the slurry to 7.0. This required about 1.0% alum based on the dry weight of the pigment. The slurry was mixed for 10 minutes. The pH of the slurry was 7.0 and the viscosity was 90 cps. 1000 ml. of the slurry was poured into a liter cylinder and allowed to stand undisturbed for one week after which it was tested as in Example I.

This data indicates that the optimum conditions for hydrated silica slurries to be stabilized differs from the sodium alumino silicate slurries, but treatment with alum on a slurry containing a solids concentration of up to 23% hydrated silica is effective at a pH of about 7.

EXAMPLE 23

To a tank car, capacity 8000 gallons, of an aqueous slurry of sodium aluminosilicate pigment containing 25.3% solids and having a pH of 9.2 sufficient alum was added to lower the pH to 7.5. The tank car was opened after a week of travel and the slurry was pumped out. The car was drained completely with about 2 inches of pasty cake remaining on the bottom. The slurry was substantially homogeneous throughout as evidenced by the pounds of pigment per gallon of slurry in samples taken from the top, middle and bottom of the tank car.

EXAMPLE 24

To a tank car, capacity 8000 gallons, of an aqueous slurry of sodium aluminosilicate pigment containing 24% solids (2.35 lbs./gal.) and having a pH of 10, sufficient alum was added to lower the pH to 7.5, subsequently 0.25% tetrasodium pyrophosphate (TSPP) based on the dry weight of the pigment was added. The tank car was opened after a week of travel and the slurry was pumped out. The car was drained completely with about 2 inches of pasty cake remaining on the bottom. The slurry was substantially homogeneous throughout as evidenced by the pounds of pigment per gallon of slurry in samples taken from the top, middle and bottom of the tank car.

The results from each of Example 23 and 24 are shown in Table III.

*Table III*

| Treatment | Pounds of Pigment per Gallon | | |
|---|---|---|---|
| | Top | Middle | Bottom |
| Alum | 1.95 | 2.76 | 2.75 |
| Alum + TSPP | 1.86 | 2.48 | 2.76 |

The characteristics of the pigment slurry are affected by temperature as shown in the following examples.

EXAMPLE 25

The solids content of an aqueous slurry of sodium aluminosilicate pigment (Zeolex® 23) was reduced from 27.4% to 26% by the addition of water and mixed for 10 minutes. The pH of the slurry was 9.2 and the viscosity at 68° F. was 344 centipoises. 1000 ml. of the slurry was poured in a liter cylinder and allowed to stand undisturbed for a week. After the week of standing, the slurry was tested for water on top, pH, viscosity and characteristics upon probing.

EXAMPLE 26

The solids content of an aqueous slurry of sodium aluminosilicate pigment (Zeolex® 23) was reduced from 27.4% to 26% with water. Sufficient $Al_2(SO_4)_3 \cdot 14H_2O$ was added to reduce the pH of the slurry to 8.0. The slurry was mixed for 10 minutes. The pH of the slurry was 8.0 and the viscosity at 68° F. was 110 centipoises. 1000 ml. of the slurry was poured in a liter cylinder and allowed to stand undisturbed for one week after which it was tested as in Example 25.

EXAMPLE 27

The procedure of Example 26 was repeated except sufficient alum was added to the slurry to bring the pH down to 7.0. The slurry was tested as in Example 25 after standing one week.

EXAMPLE 28

The procedure of Example 26 was repeated except sufficient alum was added to the slurry to bring the pH down to 6.0. The slurry was tested as in Example 25 after standing one week.

In order to determine the effect of temperature variations on the viscosity of the pigment slurries when compared to those of Examples 25–28, the following experiments were carried out.

EXAMPLE 29

The procedure of Example 25 was repeated except the slurry was heated to 119° F. The slurry was tested as in Example 25, after standing one week.

EXAMPLE 30

The procedure of Example 26 was repeated, except the slurry was heated to 119° F. The viscosity of the freshly prepared slurry was then taken.

EXAMPLE 31

The procedure of Example 27 was repeated, except the slurry was heated to 119° F. The viscosity of the freshly prepared slurry was then taken.

EXAMPLE 32

The procedure of Example 28 was repeated, except the slurry was heated to 119° F. The slurry was tested as in Example 25, after standing one week. The results from Examples 25 through 32 are shown in Table IV.

Table IV

| Example | Treatment | Percent Solids | Temperature, °F. | Viscosity, Fresh | pH, Fresh | Stability After Standing One Week | | | | |
|---|---|---|---|---|---|---|---|---|---|---|
| | | | | | | Water on Top, in. | Probe | pH | Viscosity | Temperature, °F. |
| 25 | Control | 26 | 68 | 344 | 9.2 | .375 | Thick | 9.1 | 246 | 72 |
| 26 | Alum | 26 | 68 | 110 | 8.0 | .125 | Fluid | 8.2 | 32 | 72.5 |
| 27 | do | 26 | 68 | 460 | 7.0 | .0635 | do | 7.2 | 28 | 73 |
| 28 | do | 26 | 68 | 1,020 | 6.0 | .19 | do | 6.0 | 78 | 72 |
| 29 | Control | 26 | 119 | 1,214 | 8.9 | .125 | Thick | 9.2 | 290 | 73 |
| 30 | Alum | 26 | 119 | 84 | 8.0 | | | | | |
| 31 | do | 26 | 119 | 102 | 7.0 | | | | | |
| 32 | do | 26 | 119 | 212 | 6.0 | .0635 | Fluid | 6.5 | 34 | 73 |

The data indicates that the untreated pigment slurry has a very high viscosity when heated. When the hot slurry is treated according to this invention, the viscosity drops and the treated slurry is stabilized.

The data in Table IV also indicates that the most suitable viscosity of the treated pigment slurry is between pH 7.0 and pH 8.0. Within this range, we have found that when the pH of an aqueous slurry of sodium aluminosilicate pigments is maintained between 7.3 and 7.5, the best viscosity and stability characteristics are imparted to the system.

The foregoing is illustrative only and additional modifications may be made without departing from the substance of the invention as defined in the appended claims.

We claim:

1. The process of preventing the settling and stratification upon ageing of a finely divided particulate inorganic pigment of submicron particle size, in aqueous slurry, said pigment selected from the group consisting of sodium aluminosilicate, hydrated silica, and alumina hydrate, which comprises treating the pigment slurry with sufficient acidic material to produce a pH of from about 5.8 to about 8.1 and a fresh viscosity of from about 20 to about 2000 centipoises and a viscosity after one week of from about 10 to about 330 centipoises.

2. The process of claim 1 in which the acidic substance is selected from the group consisting of aluminum sulfate, sulfuric acid, aluminum sulfate together with tetra sodium pyrophosphate, and sulfuric acid together with carboxymethyl cellulose.

3. The process of claim 1 in which the pigment is sodium aluminosilicate.

4. The process of claim 1 in which the solids content of said aqueous slurry is at least 20% by weight.

5. A stabilized, non-stratified, aqueous slurry containing about 20% to 30% by weight of finely divided particulate sodium alumino-silicate of submicron particle size and having a pH of from about 5.8 to 8.1 and a viscosity of from about 20 to 2000 centipoises.

6. The process of stabilizing an aqueous slurry containing about 20% to 30% by weight of finely divided particulate sodium aluminosilicate pigment of submicron particle size which comprises treating the pigment slurry with sufficient acidic substance selected from the group consisting of aluminum sulfate, sulfuric acid, aluminum sulfate together with tetra sodium pyrophosphate, and sulfuric acid together with carboxymethyl cellulose to produce a pH of from about 5.8 to about 8.1.

7. The process of stabilizing an aqueous slurry containing about 20% to 30% by weight of finely divided particulate sodium aluminosilicate pigment of submicron particle size which comprises treating the pigment slurry with sufficient aluminum sulfate to produce a pH of about 5.8 to about 8.1.

References Cited by the Examiner

UNITED STATES PATENTS

| | | | |
|---|---|---|---|
| 2,331,858 | 10/1943 | Freeman et al. | 106—197 |
| 2,399,237 | 4/1946 | Maloney | 252—313 |
| 2,426,140 | 8/1947 | Bollaert | 106—308 |
| 2,440,601 | 4/1948 | Dickerman | 106—308 |
| 2,630,410 | 3/1953 | Clapsdale et al. | 252—313 |
| 2,909,451 | 10/1959 | Lawler et al. | 252—313 |
| 2,923,649 | 2/1960 | Todd | 106—197 |
| 2,947,645 | 4/1960 | Milne | 106—197 |
| 2,995,458 | 8/1961 | Murray | 106—308 |
| 3,112,265 | 11/1963 | Yuille | 252—8.6 |
| 3,130,063 | 4/1964 | Millman et al. | 106—193 X |
| 3,149,073 | 9/1964 | Nemos et al. | 252—8.6 X |
| 3,228,784 | 1/1966 | Mays et al. | 106—288 |

ALEXANDER H. BRODMERKEL, *Primary Examiner.*

J. H. WOO, *Assistant Examiner.*